US009602351B2

(12) United States Patent
Mahajan et al.

(10) Patent No.: US 9,602,351 B2
(45) Date of Patent: Mar. 21, 2017

(54) PROACTIVE HANDLING OF NETWORK FAULTS

(71) Applicant: Microsoft Technology Licensing, LLC, Redmond, WA (US)

(72) Inventors: Ratul Mahajan, Seattle, WA (US); Ming Zhang, Redmond, WA (US); Srikanth Kandula, Redmond, WA (US); Hongqiang Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

(21) Appl. No.: 14/298,820

(22) Filed: Jun. 6, 2014

(65) Prior Publication Data

US 2015/0358200 A1 Dec. 10, 2015

(51) Int. Cl.
*H04L 12/24* (2006.01)
*H04L 12/703* (2013.01)
*H04L 12/801* (2013.01)
*H04L 12/825* (2013.01)

(52) U.S. Cl.
CPC ........ *H04L 41/085* (2013.01); *H04L 41/0663* (2013.01); *H04L 41/0668* (2013.01); *H04L 41/0896* (2013.01); *H04L 41/12* (2013.01); *H04L 41/145* (2013.01); *H04L 41/147* (2013.01); *H04L 45/28* (2013.01); *H04L 47/12* (2013.01); *H04L 47/25* (2013.01); *H04L 41/142* (2013.01)

(58) Field of Classification Search
None
See application file for complete search history.

(56) References Cited

U.S. PATENT DOCUMENTS

| 5,537,580 A | 7/1996 | Giomi et al. |
| 5,850,505 A | 12/1998 | Grover et al. |
| 6,606,580 B1 * | 8/2003 | Zedda ................ G05B 13/0265 702/182 |

(Continued)

FOREIGN PATENT DOCUMENTS

| EP | 1946502 A1 | 7/2008 |
| WO | WO9834350 A2 | 8/1998 |
| WO | WO2013071965 A1 | 5/2013 |

OTHER PUBLICATIONS

Jin et al., "Dynamic Scheduling of Network Updates", in the Proceedings of the 2014 Conference on SIGCOMM, Aug. 2014, pp. 539-550.

(Continued)

*Primary Examiner* — Alpus H Hsu
(74) *Attorney, Agent, or Firm* — Jacob P. Rohwer; Newport IP, LLC

(57) ABSTRACT

The techniques and/or systems described herein implement a fault handling service that is able to ensure that at least part of a network can avoid congestion (e.g., a link exceeding capacity) as long as a predetermined maximum number of faults is not exceeded. The fault handling service models different combinations of possible faults based on network topology and then computes an amount of traffic to be communicated via individual paths such that congestion is avoided as long as a number of actual faults that occur is less than or equal to the predetermined maximum number of faults.

20 Claims, 7 Drawing Sheets

(56) References Cited

U.S. PATENT DOCUMENTS

| | | | |
|---|---|---|---|
| 6,724,722 B1 | 4/2004 | Wang et al. | |
| 7,221,945 B2 | 5/2007 | Milford et al. | |
| 7,251,582 B2* | 7/2007 | Singh | G05B 23/0254 702/183 |
| 7,469,392 B2 | 12/2008 | Mang et al. | |
| 7,539,133 B2 | 5/2009 | van Haalen et al. | |
| 7,552,205 B2 | 6/2009 | Lamb et al. | |
| 7,610,386 B1 | 10/2009 | Martinez et al. | |
| 7,680,055 B1* | 3/2010 | Ramakrishnan | H04L 41/0896 370/238 |
| 7,730,364 B2* | 6/2010 | Chang | G06F 11/008 714/47.2 |
| 7,746,784 B2 | 6/2010 | de Heer | |
| 7,796,500 B1 | 9/2010 | Elliott et al. | |
| 7,797,648 B1 | 9/2010 | Huang | |
| 7,831,627 B2 | 11/2010 | Chickering et al. | |
| 7,839,789 B2* | 11/2010 | Kakadia | H04L 69/40 370/235 |
| 7,894,478 B2 | 2/2011 | Ullmann et al. | |
| 7,990,885 B2 | 8/2011 | Rajan | |
| 7,996,719 B2* | 8/2011 | Bernabeu-Auban | G06F 11/008 714/26 |
| 8,086,701 B2 | 12/2011 | Goel et al. | |
| 8,135,990 B2* | 3/2012 | Vankov | H04L 41/0681 714/33 |
| 8,175,846 B2* | 5/2012 | Khalak | G06F 19/345 702/181 |
| 8,228,804 B2 | 7/2012 | Ninan et al. | |
| 8,369,222 B2* | 2/2013 | Kakadia | H04L 69/40 370/235 |
| 8,463,916 B2 | 6/2013 | Rabbie et al. | |
| 8,494,539 B1 | 7/2013 | Surazski et al. | |
| 8,612,583 B2 | 12/2013 | Hui et al. | |
| 8,613,002 B2 | 12/2013 | Narayanan et al. | |
| 8,644,161 B2 | 2/2014 | Woundy et al. | |
| 8,700,958 B2* | 4/2014 | Vankov | H04L 41/0681 714/33 |
| 8,819,220 B2* | 8/2014 | Nagura | H04L 41/065 709/223 |
| 8,826,032 B1 | 9/2014 | Yahalom et al. | |
| 8,887,132 B1 | 11/2014 | Hunter | |
| 9,110,524 B1 | 8/2015 | Jiang et al. | |
| 9,141,625 B1 | 9/2015 | Thornewell et al. | |
| 2002/0130872 A1 | 9/2002 | Novikova et al. | |
| 2003/0014644 A1 | 1/2003 | Burns et al. | |
| 2003/0055668 A1 | 3/2003 | Saran et al. | |
| 2003/0106062 A1 | 6/2003 | Shteyn et al. | |
| 2003/0220906 A1 | 11/2003 | Chickering | |
| 2004/0218535 A1 | 11/2004 | Liong et al. | |
| 2005/0076339 A1 | 4/2005 | Merril et al. | |
| 2005/0188242 A1 | 8/2005 | Rabbat et al. | |
| 2006/0103869 A1 | 5/2006 | Kato | |
| 2007/0073737 A1 | 3/2007 | Patterson | |
| 2007/0282914 A1 | 12/2007 | Sivapragasam et al. | |
| 2008/0215713 A1 | 9/2008 | Cannon et al. | |
| 2008/0262992 A1 | 10/2008 | Meijer et al. | |
| 2008/0271022 A1 | 10/2008 | Strassner et al. | |
| 2008/0300851 A1 | 12/2008 | Chakrabarti et al. | |
| 2009/0161878 A1 | 6/2009 | Nam et al. | |
| 2009/0172689 A1 | 7/2009 | Bobak et al. | |
| 2009/0240645 A1 | 9/2009 | Cowham | |
| 2009/0327199 A1 | 12/2009 | Weber et al. | |
| 2010/0250744 A1 | 9/2010 | Hadad et al. | |
| 2011/0116389 A1 | 5/2011 | Tao et al. | |
| 2011/0154132 A1 | 6/2011 | Aybay | |
| 2011/0185359 A1 | 7/2011 | Chakrabarti | |
| 2011/0191109 A1 | 8/2011 | Harma | |
| 2011/0231573 A1 | 9/2011 | Vasseur et al. | |
| 2012/0101980 A1 | 4/2012 | Taleghani et al. | |
| 2012/0163178 A1 | 6/2012 | Gordon et al. | |
| 2012/0166660 A1 | 6/2012 | Zhang et al. | |
| 2012/0167168 A1 | 6/2012 | Orr et al. | |
| 2012/0209582 A1 | 8/2012 | Purushothaman | |
| 2012/0216201 A1 | 8/2012 | Aghajanyan et al. | |
| 2012/0221678 A1 | 8/2012 | Tanaka | |
| 2012/0323702 A1 | 12/2012 | Puentes et al. | |
| 2012/0324472 A1 | 12/2012 | Rossbach et al. | |
| 2013/0031253 A1 | 1/2013 | Hui et al. | |
| 2013/0060929 A1 | 3/2013 | Koponen et al. | |
| 2013/0114466 A1 | 5/2013 | Koponen et al. | |
| 2013/0121331 A1 | 5/2013 | Vasseur et al. | |
| 2013/0250805 A1* | 9/2013 | Hansmann | H04L 41/12 370/254 |
| 2013/0294250 A1 | 11/2013 | Berelejis et al. | |
| 2013/0329632 A1 | 12/2013 | Buyukkoc et al. | |
| 2014/0020043 A1 | 1/2014 | Anand et al. | |
| 2014/0126395 A1 | 5/2014 | Matthews et al. | |
| 2014/0244218 A1* | 8/2014 | Greenberg | G06F 17/504 703/1 |
| 2015/0010012 A1 | 1/2015 | Koponen et al. | |
| 2015/0032894 A1 | 1/2015 | Rosensweig et al. | |
| 2015/0106781 A1 | 4/2015 | Adler et al. | |
| 2015/0178366 A1 | 6/2015 | Farahbod et al. | |
| 2015/0205596 A1 | 7/2015 | Hiltegen et al. | |
| 2015/0220216 A1 | 8/2015 | Wigdor et al. | |
| 2015/0249587 A1* | 9/2015 | Kozat | H04L 43/10 370/222 |
| 2015/0275806 A1* | 10/2015 | Genslak | F02D 41/1401 701/104 |
| 2015/0301878 A1 | 10/2015 | Chen et al. | |
| 2015/0309969 A1 | 10/2015 | Kahn | |
| 2015/0362559 A1 | 12/2015 | Hametner et al. | |
| 2016/0042045 A1 | 2/2016 | Adoc, Jr. et al. | |
| 2016/0055226 A1 | 2/2016 | Bruening et al. | |

OTHER PUBLICATIONS

Lim et al., "Congestion-Free Routing Reconfiguration: Formulation and Examples", in the Proceedings of the 2014 48th Annual Conference on Information Sciences and Systems, Mar. 2014, pp. 1-6.

PCT Search Report & Written Opinion for Application No. PCT/US2015/033860, mailed on Oct. 21, 2015, 13 pages.

PCT Search Report & Written Opinion for Application No. PCT/US2015/034089, mailed on Sep. 10, 2015, 11 pages.

PCT Search Report & Written Opinion for Application No. PCT/US2015/034088, mailed on Sep. 8, 2015, 12 pages.

Radetzki, "Fault-Tolerant Differential Q Routing in Arbitrary NoC Topologies", in the Proceedings of 2011 IFIP 9th International Conference on Embedded and Ubiquitous Computing, Oct. 24, 2011, pp. 33-40.

Sherwood et al., "Can the Production Network be the Testbed?", In the Proceedings of the 9th USENIX Conference on Operating Systems Design and Implementation, Art. 1-6, Oct. 4, 2010, 14 pages.

Stribling et al., "Flexible, Wide-area Storage for Distributed Systems with WheelFS", In the Proceedings of the 6th USENIX Symposium on Networked systems Design and Implementation, Apr. 22, 2009, 16 pages.

"Summary of the Dec. 24, 2012 Amazon ELB Service Event in the US-East Region", retrieved on Mar. 11, 2014 at <<aws.amazon.com/message/680587>>, Amazon Web Services, 2014.

Takita et al., "Network Reconfiguration Targeting Minimum Connection Disruption", in the Proceedings of the 2014 International Conference on Optical Network Design and Modeling, May 2014, pp. 198-203.

Tarjan, "Depth-First Search and Linear Graph Algorithms", In SIAM Journal on Computing, vol. 1, No. 2, Jun. 1972, pp. 146-160.

Terry, "Replicated Data Consistency Explained Through Baseball", Microsoft Technical Report, Oct. 2011, 14 pages.

Vanbever et al., "Seamless Network-wide IGP Migrations" In the Proceedings of the ACM SIGCOMM 2011 Conference, Aug. 15, 2011, pp. 314-325.

Vanbever, et al., "Lossless Migrations of Link-State IGPs", Journal of IEEE/ACM Transactions on Networking, vol. 20, Issue 6, Dec. 2012, 14 pages.

Voellmy et al., "Maple: Simplifying SDN Programming Using Algorithmic Policies", In the Proceedings of the ACM SIGCOMM 2013 Conference on SIGCOMM, Aug. 12, 2013, pp. 87-98.

(56) References Cited

OTHER PUBLICATIONS

Wu et al., "NetPilot: Automating Datacenter Network Failure Mitigation", In the Proceedings of the ACM SIGCOMM Computer Communication Review, vol. 42, Iss. 4, Aug. 13, 2012, 12 pages.
Wu et al., "SPANStore: Cost-effective Geo-Replicated Storage Spanning Multiple Cloud Services", In the Proceedings of the Twenty-Fourth ACM Symposium on Operating Systems Principles, Nov. 3, 2013, pp. 292-308.
Zhang-Shen, et al., "Designing a Fault-Tolerant Network Using Valiant Load-Balancing", in the Proceedings of the 27th IEEE Conference on Computer Communications, Apr. 13, 2008, 5 pages.
Al-Fares et al., "Hedera: Dynamic Flow Scheduling for Data Center Networks", In the Proceedings of the 7th USENIX Conference on Networked Systems Design and Implementation, Apr. 28, 2010, 15 pages.
Applegate et al., "Coping with Network Failures: Routing Strategies for Optimal Demand Oblivious Restoration", In the Proceedings of the Joint International Conference on Measurement and Modeling of Computer Systems, Jun. 10, 2004, pp. 270-281.
Applegate et al., "Making Intra-domain Routing Robust to Changing and Uncertain Traffic Demands: Understanding Fundamental Tradeoffs", In the Proceedings of the 2003 Conference on Applications, Technologies, Architectures, and Protocols for Computer Communications, Aug. 25, 2008, pp. 313-324.
Atlas et al., "Basic Specification for IP Fast-Reroute: Loop-Free Alternates", The Internet Engineering Task Force, 2008 Request for Comments, Sep. 2008, 31 pages.
Ballani et al., "Towards Predictable Datacenter Networks", In the Proceedings of the ACM SIGCOMM 2011 Conference, Aug. 15, 2011, 12 pages.
Batcher, "Sorting Networks and Their Applications", In the Proceedings of the AFIPS 1968 Spring Joint Computer Conference, Apr. 30, 1968, 8 pages.
Benson et al., "Micro TE: Fine Grained Traffic Engineering for Data Centers", In the Proceedings of the 7th Conference on Emerging Networking Experiments and Technologies, Article 8, Dec. 6, 2011, 12 pages.
Casado et al., "Fabric: A Retrospective on Evolving SDN", In the Proceedings of the 1st Worksho on Hot Topics in Software Defined Networks, Aug. 13, 2012, 5 pages.
"CPLEX Optimizer", retrieved on Mar. 10, 2014 at <<www-01.ibm.com/software/commerce/optimization/cplex-optimizer/>>, IBM, 2014.
Curtis et al., "DevoFlow: Scaling Flow Management for High-Performance Networks", In the Proceedings of the ACM SIGCOMM 2011 Conference, Aug. 15, 2011, 12 pages.
Dugan et al., "Iperf", retrieved on Mar. 10, 2014 at <<sourceforge.net/projects/iperf/>>, Dice Holdings, Inc., 2013.
Elwalid et al., "MATE: MPLS Adaptive Traffic Engineering", In the Proceedings of Twentieth Annual Joint Conference of the IEEE Computer and Communciations Societies, Apr. 22, 2001, 10 pages.
Even et al., "On the Complexity of Time Table and Multi-commodity Flow Problems", In the Proceedings of the 16th Annual Suymposium on Foundations of Computer Science, Oct. 13, 1975, pp. 184-193.
Gill et al., "Understanding Network Failures in Data Centers: Measurement, Analysis, and Implications", In the Proceedings of the ACM SIGCOMM 2011 Conference, Aug. 15, 2011, pp. 350-361.
Hong et al., "Achieving High Utilization with Software-driven WAN", In the Proceedings of the ACM SIGCOMM 2013 Conference on SIGCOMM, Aug. 12, 2013, pp. 15-26.
Jain et al, "B4: Experience with a Globally-deployed Software Defined Wan", In the Proceedings of the ACM SIGCOMM 2013 Conference, Aug. 12, 2013, pp. 3-14.
Kandula et al., "Flyways to De-Congest Data Center Networks", In the Proceedings of the 8th ACM Workshop on Hot Topics in Networks, Oct. 23, 2009, 6 pages.
Kandula et al., "Walking the Tightrope: Responsive yet Stable Traffic Engineering", In the Proceedings of the 2005 Conference on Applications, Technologies, Architectures, and Protocols for Computer Communications, Aug. 22, 2005, 12 pages.
Kar et al., "Routing Restorable Bandwidth Guaranteed Connectons Using Maximum 2-Route Flows", IEEE/ACM Transaction on Networking (TON), vol. 11, Iss. 5, Oct. 2003, 11 pages.
Kodialam et al., "Dynamic Routing of Restorable Bandwidth-Guaranteed Tunnels Using Aggregated Network Resources Usage Information", IEEE/ACM Transactions on Networking (TON), vol. 11, Iss. 3, Jun. 2003, pp. 399-410.
Liu et al., "zUpdate: Updating Data Center Networks with Zero Loss", In the Proceedings of the ACM SIGCOMM 2013 Conference on SIGCOMM, Aug. 12, 2013, pp. 411-422.
Markopoulou et al., "Characterization of Failures in an Operational IP Backbone Network", IEEE/ACM Transactions on Networking (TON), vol. 16, Iss. 4, Aug. 2008, pp. 749-762.
"Microsoft Solver Foundation", retrieved on Mar. 10, 2014 at <<http://msdn.microsoft.com/en-us/devlabs/hh145003.aspx>>, Microsoft Corp., 2014.
"OpenFlow Switch Specification", Stanford University, Feb. 28, 2011, 56 pages.
Raghavan et al., "Cloud Control with Distributed Rate Limiting", In the Proceedings of the 2007 Conference on Applications, Technologies, Architectures, and Protocols for Computer Communications, Aug. 27, 2007, 12 pages.
Sengupta et al., "Efficient and Robust Routing of Highly Variable Traffic", In the Proceedings of the Third Workshop on Hot Topics in Networks, Nov. 2004, 6 pages.
Sharafat et al., "MPLS-TE and MPLS VPNS with Openflow", In the Proceedings of teh ACM SIGCOMM 2011 Conference, Aug. 15, 2011, pp. 452-453.
Suchara et al., "Network Architecture for Joint Failure Recovery and Traffic Engineering", In the Proceedings of the ACM SIGMETRICS Joint International Conference on Measurement and Modeling of Computer Systems, Jun. 7, 2011, 12 pages.
Susitaival et al., "Adaptive load balancing with OSPF", Netowrking Laboratory, Helsink University of Technology, Finland, Jan. 2004, 18 pages.
Turner et al., "California Fault Lines: Understanding the Causes and Impact of Network Failures", In the Proceedings of the ACM SIGCOMM 2010 Conference, Aug. 30, 2010, 12 pages.
Wang et al., "COPE: Traffic Engineering in Dynamic Networks", In the Proceedings of the 2006 Conference on Applications, Technologies, Architectures, and Protocols for Computer Communciations, Sep. 11, 2006, 12 pages.
Wang et al., "R3: Resilient Routing Reconfiguration", In the Proceedings of the ACM SIGCOMM 2010 Conference, Aug. 30, 2010, 12 pages.
Xu et al., "Link-State Routing with Hop-by-Hop Forwarding Can Achieve Optimal Traffic Engineering", IEE/ACM Transactions on Networking (TON) Journal, vol. 19, Iss. 6, Dec. 2001, 14 pages.
Agrawal et al., "Policy-based Management of Networked Computing Systems," IEEE Communications Magazine, vol. 43, Iss. 10, Oct. 2005, 9 pages.
"Arista 7500 Series Technical Specifications", retrieved on Mar. 10, 2014 at <<http://www.aristanetworks.com/en/products/7500series/specifications>>, Arista Networks, Inc., 2014.
Bailis et al., "Eventual Consistency Today: Limtiations, Extensions, and Beyond", Queue, vol. 11, Issue 3, Mar. 2013, 13 pages.
Ballani et al., "CONMan: A Step Towards Network Manageability", In the Proceedings of the 2007 Conference on Applications, Technologies, Architectures, and Protocols for Computer Communications, Aug. 27, 2007, 15 pages.
Bivens et al., "Scalability and Performance of an Agent-based Network Management Middleware", In the International Journal of Network Management, vol. 14, Iss. 2, Mar. 1, 2004, 58 pages.
Caesar et al., "Design and Implementation of a Routing Control Platform", In the Proceedings of the 2nd Conference on Symposium on Networked Systems Design & Implementation vol. 2, May 2, 2005, 14 pages.
Casado et al., "Ethane: Taking Control of the Enterprise", In the Proceedings of the 2007 Confernece on Applications, Technologies, Architectures, and Protocols for Compuer Communications, Aug. 27, 2007, pp. 1-12.

(56) References Cited

OTHER PUBLICATIONS

Casado et al., "Rethinking Enterprise Network Control", IEEE/ACM Transactions on Networking, vol. 17, Issue 4, Aug. 1, 2009, pp. 1270-1283.

Casado et al., "SANE: A Protection Architecture for Enterprise Networks", In the Proceedings of the 15th conference on USENIX Security Symposium, vol. 15, Art. 10, Jul. 31, 2006, 15 pages.

Cormen et al., "Introduction to Algorithms", Third Edition, MIT Press, Ch. 7, "Graph Algorithms", Feb. 2009, pp. 586-766.

Dobrescu et al., "Toward a Verifiable Software Dataplan", In the Proceedings of the 12th ACM Workshop on Hot Topics in Networks, Art. 18, Nov. 21, 2013, 7 pages.

Feamster et al., "The Road to SDN: An Intellectual History of Programmable Networks", In the Proceedings of ACM Dueue, vol. 11, No. 12, Dec. 30, 2013, 13 pages.

Feamster, et al., "Detecting BGP Configuration Faults with Static Analysis", Proceedings of the 2nd Conference on Symposium on Networked Systems Design &Implementation, vol. 2, May 2005, 14 pages.

Ferguson et al., "Participatory Networking: an API for Application Control of SDNs", In the Proceedings of the ACM SIGCOMM 2013 Conference on SIGCOMM, Aug. 12, 2013, pp. 327-338.

Francois et al., "Avoiding Disruptions During Maintenance Operations on BGP Sessions", IEE Transactions on Network and Service Management, vol. 4, Issue 3, Dec. 2007, pp. 1-11.

Francois, et al., "Avoiding Transient Loops During the Convergence of Link-State Routing Protocols", Journal of IEEE/ACM Transactions on Networking, vol. 15, Issue 6, Dec. 2007, 13 pages.

Francois, et al., "Disruption free topology reconfiguration in OSPF networks", 26th IEEE International Conference on Computer Communications, May 2007, 9 pages.

Ghorbani, et al., "Walk the Line: Consistent Network Updates with Bandwidth Guarantees", Proceedings of the 1st Workshop on Hot Topics in Software Defined Networks, Aug. 2012, 6 pages.

"Google Official Blog", retrieved on Mar. 11, 2014 at <<http://googleblog.blogspot.in/2013/01/todays-outagefor-several-google.html>>, Google, Inc., 2014.

Greenberg et al., "A Clean Slate 4D Approach to Network Control and Management", ACM SIGCOMM Computer Communication Review, vol. 35, Issue 5, Oct. 6, 2005, pp. 41-54.

Gude et al., "NOX: Towards an Operating System for Networks", In the Proceedings of the ACM SIGCOMM Computer Communciation Review, vol. 38, Iss. 3, Jul. 1, 2008, 6 pages.

Heller et al., "ElasticTree: Saving Energy in Data Center Networks" In the Proceedings of the 7th USENIX Conferece on Networked Systems Design and Implementation, Apr. 28, 2010, 16 pages.

Hunt et al., "ZooKeeper: Wait-Free Coordination for Internet-Scale Systems", In the Proceedings of the USENIX Conference on USENIX Annual Techinical Conference, Jun. 23, 2010, 14 pages.

John, et al., "Consensus Routing: The Internet as a Distributed System" Proceedings of the 5th USENIX Symposium on Networked Systems Design and Implementation, Apr. 2008, 14 pages.

Katta et al., "Incremental Consistent Updates", In the Proceedings of the 2nd ACM SIGCOMM Workshop on Hot Topics in Software Defined Networking, Aug. 16, 2013, pp. 49-54.

Kazemian et al., "Header Space Analysis: Static Checking for Networks", In the Proceedings of the 9th USENIX Conference on Networked Systems Design and Implementation, Apr. 25, 2012, 14 pages.

Kazemian, et al., "Real Time Network Policy Checking using Header Space Analysis", Proceedings of 10th USENIX Conference on Networked Systems Design and Implementation, Apr. 2013, 13 pages.

Khurshid, et al., "VeriFlow: Verifying Network-Wide Invariants in Real Time", Proceedings of 1st Workshop on Hot Topics in Software Defined Networks, Aug. 2012, 6 pages.

Koponen et al., "Network Virtualization in Multi-Tenant Data Centers", In the Proceedings of the 11th USENIX Conference on Networked Systems Design and Implementation, Apr. 2, 2014, pp. 203-216.

Koponen et al., "Onix: A Distributed Control Platform for Large-scale Production Networks", In the Proceedings of teh 9th USENIX Conference on Operating Systems Design and Implementation, Article 1-6, Oct. 4, 2010, 14 pages.

Kushman, et al., "R-BGP: Staying Connected in a Connected World", Proceedings of the 4th USENIX Conference on Networked Systems Design & Implementation, Apr. 2007, 14 pages.

Mahajan et al., "On Consistent Updates in Software Defined Networks", In the Proceedings of teh 12th ACM Worksop on Hot Topics in Networks, Article 20, Nov. 21, 2013, 7 pages.

Mai et al., "Debugging the Data Plane with Anteater", In the Proceedings of the ACM SIGCOMM 2011 Conference, Aug. 15, 2011, 12 pages.

McGeer, Rick, "A Correct, Zero-Overhead Protocol for Network Updates" In the Proceedings of the 2nd ACM SIGCOMM 2013 Workshop on Hot Topics in Software Defined Networking, Aug. 16, 2013, pp. 161-162.

McGeer, "A Safe, Efficient Update Protocol for OpenFlow Networks", Proceedings of the 1st Workshop on Hot Topics in Software Defined Networks, Aug. 2012, 6 pages.

McKeown et al., "OpenFlow: Enabling Innovation in Campus Networks", In the Proceedings of the ACM SIGCOMM Computer Communication Review, vol. 38, Iss. 2, Apr. 2008, pp. 69-74.

Mizrahi et al., "Time-based Updates in Software Defined Networks", In the Proceedings of the 2nd ACM SIGCOMM 2013 Workshop on Hot Topics in Software Defined Networking, Aug. 16, 2013, pp. 163-164.

Mogul et al., "Corybantic: Towards Modular Compsition of SDN Control Programs", In the Proceedings of teh 12th ACN Workshop on Hot Topics in Networks, Nov. 21, 2013, 7 pages.

Monsanto et al., "Composing Software-defined Networks", In the Proceedings of the 10th USENIX Conference on Networked Systems Design and Implementation, Apr. 2, 2013, pp. 1-13.

"Network Virtualization with VMware NSX Virtualized Network", retrieved on Mar. 10, 2014 at <<http://www.vmware.com/products/nsx/>>, VMware, Inc. 2014.

Newman, Mark, "Networks: An Introduction", Oxford University Press, May 20, 2010, Ch. 7 "Measures and Metrics", pp. 167-240.

Noyes, et al., "Toward Synthesis of Network Updates", Proceedings of the 2nd Workshop on Synthesis, Jul. 2013, 16 pages.

"Open-Source SDN Stack", retrieved on Mar. 11, 2014 at <<onlab.us/tools.html#os>>, On.Lab, 2013.

Patel et al., "Ananta: Cloud Scale Load Balancing", In the Proceedings of the ACM SIGCOMM 2013 Conference on SIGCOMM, Aug. 12, 2013, pp. 207-218.

Peresini et al., "ESPRES: Easy Scheduling and Prioritization for SDN", In the Proceedings of Open Networking Summit 2014 Research Track, Mar. 2, 2014, 2 pages.

Raghavan et al., "Software-Defined Internet Architecture: Decoupling Architecture from Infrastructure", In the Proceedings of teh 11yth ACM Workshop on Hot Topics in Networks, Oct. 29, 2012, pp. 43-48.

Raza, et al., "Graceful Network State Migrations", Journal of IEEE/ACM Transactions on Networking, vol. 19, Issue 4, Aug. 2011, 14 pages.

Reitblatt et al., "Abstractions for Network Update", In the Proceedings of the ACM SIGCOMM 2012 Conference on Applications, Technologies, Architectures, and Protocols for Computer Communication, Aug. 13, 2012, pp. 323-334.

Reitblatt et al., "Consistent Updates for Software-Defined Networks: Change You can Believe In!", In the Proceedings of the 10th ACN Workshop on Hot Topics in Networks, Nov. 14, 2011, Article 7, 2 pages.

Rotsos et al., "OFLOPS: An Open Framework for OpenFlow Switch Evaluation", In the Proceedings of teh 13th International Conference on Passive and Active Measurement, Mar. 12, 2012, 11 pages.

(56) References Cited

OTHER PUBLICATIONS

Office action for U.S. Appl. No. 14/298,762, mailed on Mar. 10, 2016, Zhang et al., "A Network-State Management Service", 12 pages.
Office action for U.S. Appl. No. 14/298,794, mailed on Mar. 23, 2016, Mahajan et al., "Dynamic Scheduling of Network Updates", 18 pages.
PCT Second Written Opinion mailed Apr. 18, 2016 for PCT Application PCT/US15/33860, 5 pages.
"International Preliminary Report on Patentability Issued in PCT Application No. PCT/US2015/034089", Mailed Date: May 26, 2016, 7 Pages.
"International Preliminary Report on Patentability Issued in PCT Application No. PCT/US2015/033860", Mailed Date: Aug. 19, 2016, 16 pages.

\* cited by examiner

EXAMPLE SORTING NETWORK
700

PROACTIVE HANDLING OF NETWORK FAULTS

BACKGROUND

As electronic services (e.g., search services, electronic mail services, social networking services, cloud computing services, etc.) continue to expand by servicing more users and providing more content, providers of the electronic services have to continually maintain and upgrade networks of devices to provide the expanded electronic services. However, the devices and the links that inter-connect the devices and communicate data within an individual network can fail, or cause a fault, which may lead to network congestion (e.g., links exceeding a communication capacity). Consequently, the network may experience packet loss that may affect the efficiency and reliability of the network.

SUMMARY

The techniques and/or systems described herein implement a fault handling service that is able to ensure that at least part of a network can avoid congestion (e.g., a link exceeding capacity) as long as a predetermined maximum number of faults is not exceeded. The fault handling service models different combinations of possible faults based on network topology and then computes an amount of traffic to be communicated via individual paths such that congestion is avoided as long as a number of actual faults that occur is less than or equal to the predetermined maximum number of faults.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

Figure 1:
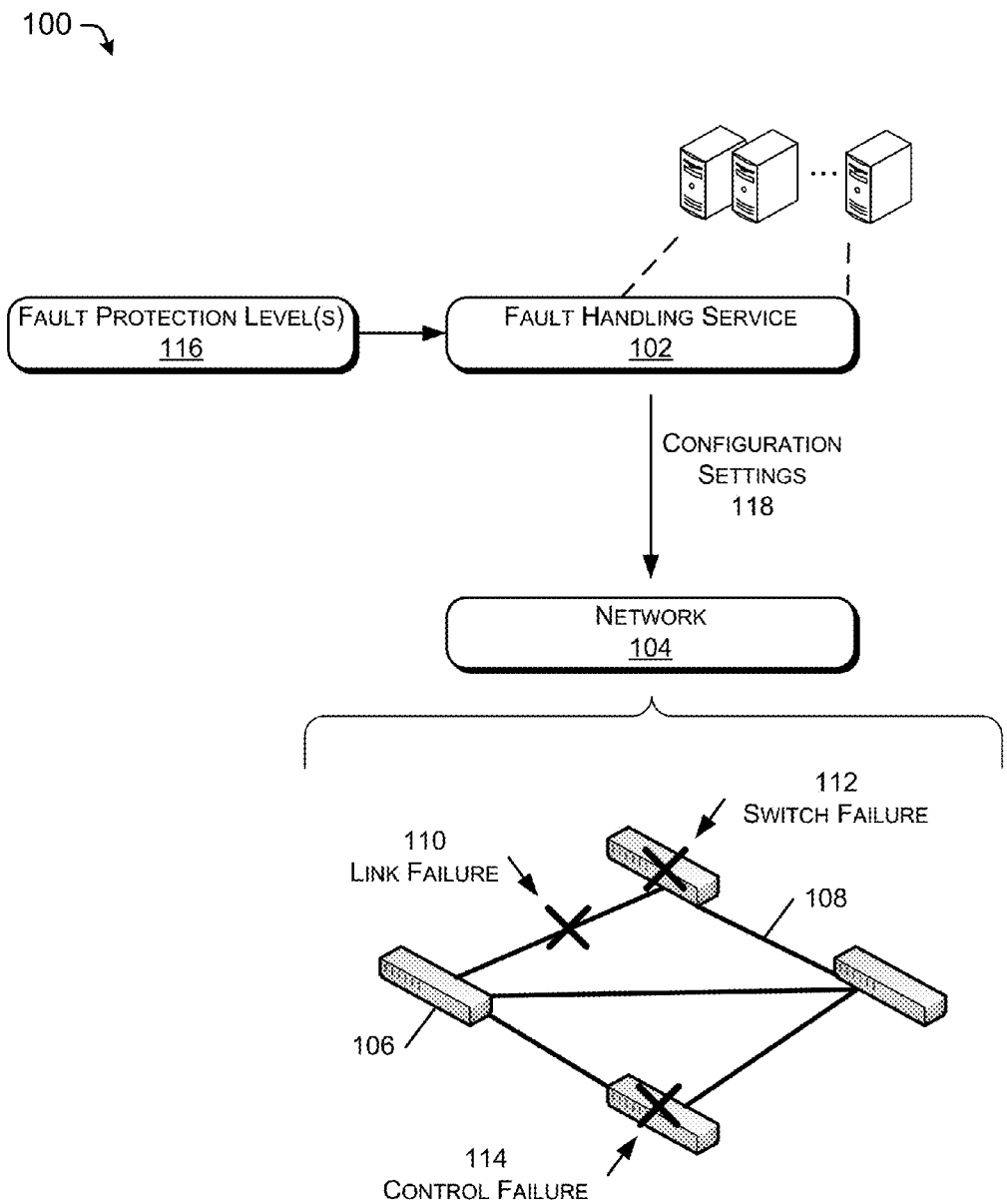
FIG. 1 illustrates a diagram in which a fault handling service configures a network to handle up to a predetermined maximum number of faults, in accordance with various embodiments.

The techniques and/or systems described herein implement a fault handling service for a network. The fault handling service proactively configures a network to handle up to a predetermined maximum number of faults. For instance, the fault handling service may receive, as inputs, a specified number of allowed faults (e.g., the predetermined maximum number of faults) and a topology of at least part of a network. The topology may include at least (i) an arrangement of network components such as devices and links between devices and (ii) information associated with one or more individual flows within the network or part of the network. Based on the input, the fault handling service is configured to compute, for individual flows, an amount of traffic to be communicated amongst one or more paths so that network congestion is avoided as long as a number of faults that actually occur in the network is less than or equal to the predetermined maximum number of faults. Then, the fault handling service may configure (e.g., issue instructions) components of the network so that flows are distributed based on the computations before the faults actually occur in the network. Thus, the fault handling service proactively configures the network so that it is robust against up to the predetermined maximum number of faults (e.g., guarantees that congestion will not occur).

A network fault may include a data plane fault or a control plane fault. A data plane fault occurs when a link (e.g., a direct link between two devices in the network) fails or when a device fails. In various implementations discussed herein, the devices associated with network faults may be switching devices, e.g., tasked with forwarding data packets within the network (e.g., traffic communicated in the network). Thus, a data plane fault may include a link failure or a switch failure that has an impact on packet forwarding. A control plane faults occur when a switching device in the network fails to reconfigure, or receive an update, in a timely manner (e.g., a complete reconfiguration failure, a delayed reconfiguration, etc.). Thus, even though the switching device continues to forward packets and has not failed, a fault may still occur because the switching device is forwarding packets based on a previous or old configuration and not the updated or new configuration. A control plane fault may result from a remote procedure call (RPC) failure, a bug in switching device firmware or software, a shortage of memory in the switching device, etc. Accordingly, the fault handling service discussed herein configures a network to proactively handle data plane faults and/or control plane faults such that the fault handling service ensures that network congestion (e.g., traffic on a link in the network will not exceed capacity) will not occur as long as a number of faults that actually occur are less than a predetermined maximum number of faults.

Conventionally, a traffic engineering controller re-configures a network in response to detecting faults. Thus, conventional approaches reduce network congestion after a fault has actually occurred and after the fault is detected, and as a consequence, network congestion likely already occurred and needs to be corrected. In many cases, the traffic engineering controller is unable to efficiently react to the faults causing network performance to be interrupted or diminished, e.g., due to packet loss (e.g., the reaction or correction may take tens of seconds). For example, if and when a link in the network fails (e.g., a fault occurs), switching devices in the network are configured to typically move traffic (e.g., rescale traffic) to other available paths. However, the movement does not account for link capacity constraints, and therefore, the movement often leads to link congestion which then must be reactively corrected.

FIG. 1 illustrates an example diagram 100 in which the fault handling service 102 described herein configures a network 104 to handle up to a predetermined maximum number of faults (e.g., one, two, three, four, ten, twenty, one hundred or any other number). The predetermined maximum number of faults may be set by an entity operating the fault handling service 102 or an entity that manages the network 104 or a particular function of the network 104 such as packet forwarding (e.g., a traffic engineering application or controller). As discussed above, the fault handling service 102 implements a proactive approach to handling faults in a network 104. For instance, the fault handling service 102 may compute an amount of traffic to be communicated via one or more paths associated with a flow such that freedom from congestion is realized for up to a predetermined maximum number of faults. Stated another way, the fault handling service 102 spreads traffic in the network such that no congestion occurs, e.g., a link does not exceed a bandwidth capacity, as long as a total number of faults that occur is less than or equal to the predetermined maximum number of allowed faults.

The network 104 may comprise a variety of devices 106 and direct links 108, e.g., a link between two devices 106 in the network 104. A direct link 108 may be at least part of a communication path that connects two devices. For example, an ingress switching device may be a source device where traffic originates and an egress switching device may be a destination device where the traffic ends. The ingress switching device may be configured or instructed to establish one or more communication paths and communicate a flow (e.g., traffic) to the egress switching device via the one or more communication paths. As discussed herein, a communication path may also be referred to as a communication tunnel, or a tunnel, through two or more devices (e.g., including the ingress switching device and the egress switching device).

In various embodiments, the network 104 may be a large production network such as a data-center network (DCN), an Internet service provider (ISP) network, an enterprise network (e.g., a cloud service) or any other administrative domain that may be under control of an entity (e.g., an entity that operates and maintains devices executing the fault handling service 102). The devices 106 may be physical network devices such as a switching device (a switch), a routing device (a router), a gateway device (a gateway), a bridging device (a network bridge), a hub device (a network hub), a firewall device, a network address translator device (a NAT), a multiplexing device (a multiplexer), a wireless access point device (a WAP), a proxy server device, a file server device, a database server device, a storage device, etc. The devices 106 may also be end-user devices capable of connecting to the network 104. For instance, an end-user device may comprise a mobile or portable device such as a smart phone, a cellular phone, a personal digital assistant (PDA), an electronic book device, a laptop computing device, a tablet computing device, a personal media player device, etc. Or, an end-user device may comprise a stationary device such as a desktop computing device, a gaming console device, a digital video recording device (a DVR), a set top box device, etc. Therefore, the network 104 may comprise tens, hundreds or thousands of devices connected to one another to comprise a domain or an administrative network.

In various examples discussed herein, the fault handling service 102 may be implemented in accordance with tunnel-based forwarding. Tunnel-based forwarding may be used in traffic engineering of networks. In tunnel-based forwarding, one or more tunnels (e.g., communication paths) are established to communicate traffic between an ingress-egress switching device pair and the communicated traffic may be referred to as a flow. As discussed above, the flow may be spread across, or distributed amongst, multiple tunnels. Therefore, the fault handling service 102 may configure an ingress switching device with weights to determine how the flow is split across the multiple tunnels.

The fault handling service 102 is configured to receive or access a topology of the network 104 and generate a model, e.g., a system of equations, based on the topology and the predetermined maximum number of faults allowed. The model represents different combinations of possible faults that can potentially occur in the network (e.g., type of a fault, location of a fault, etc.). For example, if the predetermined maximum number of allowed faults is one, then a combination of possible faults is associated with a single location in the network where the one allowed fault can occur (e.g., each switching device for a switch failure). Thus, a combination of possible faults may include a single fault. In another example, if the predetermined maximum number of allowed faults is two, then a combination of possible faults is associated with two locations in the network where the two faults can occur. In further examples, the predetermined maximum number of allowed faults may be any number such as three, five, ten, twenty, fifty, one hundred, etc.

The fault handling service 102 then uses the model to compute traffic amounts to be communicated via paths in the network. The computed traffic amounts provide room, e.g., available space, for additional traffic to arrive at a link (e.g., as part of a traffic re-scaling process in response to a fault) without the link exceeding a communication capacity as long as the number of faults that occur is less than or equal to the predetermined maximum number of faults. That is, the computation ensures that the additional traffic that may arrive at a link as a result of any combination of faults (e.g., a combination of faults where the number of faults is less than or equal to the predetermined maximum number of faults) is less than the available or spare capacity for the link, and thus, link congestion is avoided. In various embodiments, an ingress switching device may implement proportional rescaling in response to a fault such that the ingress switching device disables one or more failed tunnels (e.g., affected by the fault) and divides the traffic communicated via the one or more failed tunnels across other tunnels established for a flow (e.g., residual tunnels).

In various implementations, the network 104 may include a large number of devices (e.g., tens, hundreds, thousands, etc.) and/or links between two devices. Thus, determining the different combinations of possible faults and modeling the different combinations may present a computational challenge, e.g., a large number of constraints. Accordingly, the fault handling service 102 may encode the large number of constraints that arise and then use a sorting networks approach to solve the constraints efficiently (e.g., to compute traffic distribution for one or more flows), as further discussed herein. In some examples, the fault handling service 102 may use the sorting networks approach to sort a reduced number of constraints (e.g., associated with faults that impact the network traffic the most).

As mentioned above, a network fault may include a data plane fault and/or a control plane fault. FIG. 1 illustrates a link failure 110, a switch failure 112 and a control failure 114. The link failure 110 and the switch failure 112 are each examples of a data plane fault that may impact tunnel-based forwarding at least because a link or a switching device may be unable to handle a flow or part of a flow, and therefore, traffic in the network 104 is required to be rescaled. The control failure 114 is an example of a control plane fault that may also cause network congestion at least because a switching device along a tunnel may continue to route traffic in accordance with an old or previous configuration at a time when it is expected to route traffic in accordance with a new or updated configuration.

Prior to configuring the network 104 to proactively handle faults, the fault handling service 102 is configured to determine (e.g., access or receive) one or more fault protection level(s) 116. A fault protection level 116 may indicate a predetermined maximum number of allowed link failures (e.g., $k_e$ in the discussion below), a predetermined maximum number of allowed switch failures (e.g., $k_v$ in the discussion below), and/or a predetermined maximum number of allowed control failures (e.g., $k_c$ in the discussion below).

Based on the fault protection level(s) 116, the fault handling service 102 is configured to compute traffic amounts ensuring that network congestion is avoided as long as a total number of faults that occurs is less than or equal to the predetermined maximum number of allowed faults. The fault handling service 102 may then provide configuration settings 118 to the network 104 so that the network 104 is configured to communicate (e.g., distribute) traffic based on the computations.

Figure 2:
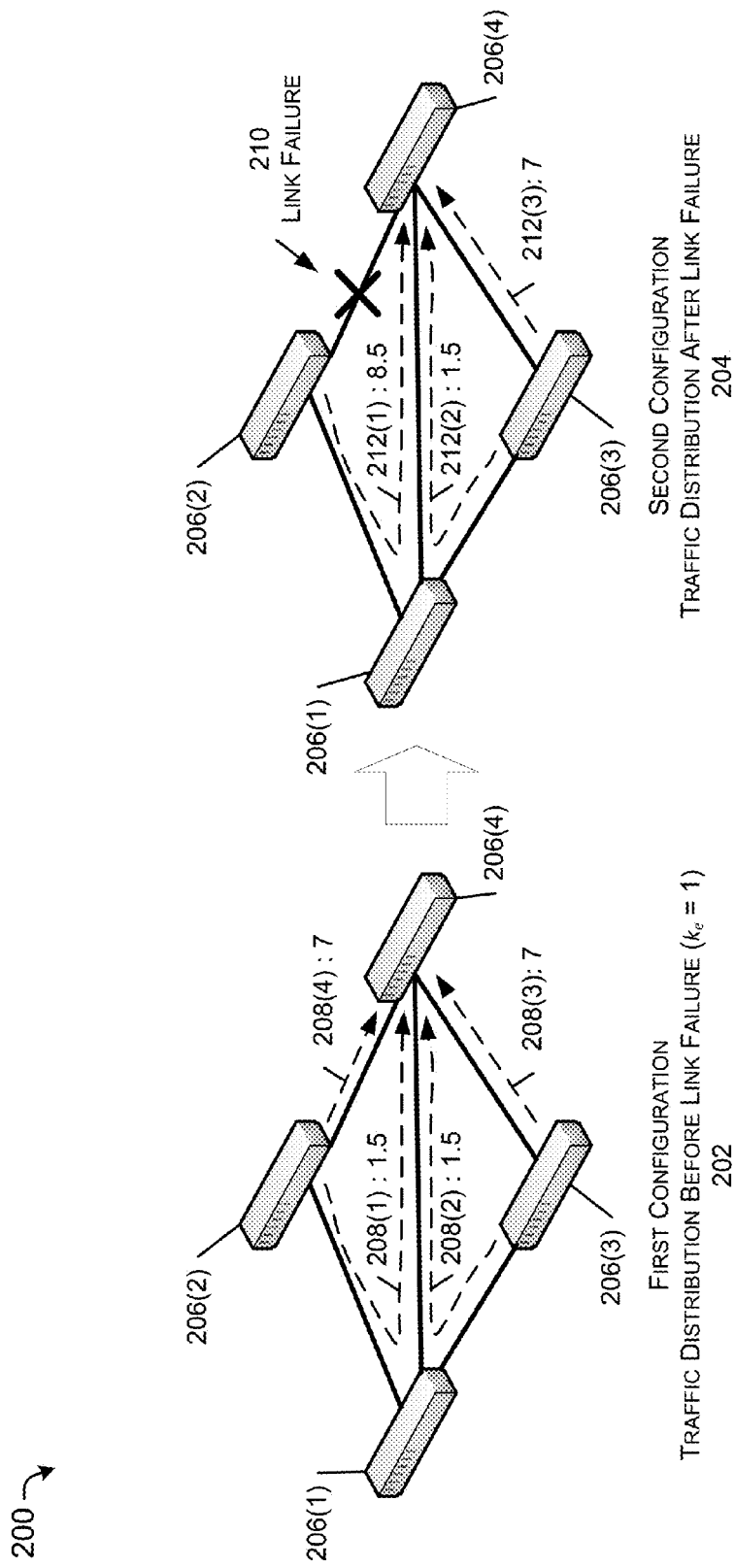
FIG. 2 illustrates a diagram that shows an example network configured to handle up to a predetermined maximum number of link failures, in accordance with various embodiments.

As an example, FIG. 2 illustrates a diagram 200 showing how the fault handling service 102 configures a network to handle up to a predetermined maximum number of link failures $k_e$, where $k_e=1$ in the example of FIG. 2. Thus, FIG. 2 is directed to data plane faults and illustrates a first configuration 202 modeling traffic distribution of a network before a link failure and a second configuration 204 modeling traffic distribution of the same network after a link failure. The network includes a first switching device 206(1), a second switching device 206(2), a third switching device 206(3), and a fourth switching device 206(4). Each link between any two devices in the network has a communication capacity or bandwidth limitation (e.g., ten units in the example of FIG. 2) that, if exceeded, may cause the link to become congested.

In the first configuration 202: a first tunnel 208(1) (tunnels are shown as a dashed line in FIG. 2) communicates 1.5 units of traffic (e.g., gigabits per second Gbps) from switching device 206(2) to switching device 206(4) via switching device 206(1), a second tunnel 208(2) communicates 1.5 units of traffic from switching device 206(3) to switching device 206(4) via switching device 206(1), a third tunnel 208(3) communicates 7 units of traffic directly from switching device 206(3) to switching device 206(4), and a fourth tunnel 208(4) communicates 7 units of traffic directly from switching device 206(2) to switching device 206(4). Accordingly, tunnel 208(1) and tunnel 208(4) may be associated with a flow where switching device 206(2) is an ingress switching device and switching device 206(4) is an egress switching device. Moreover, tunnel 208(2) and tunnel 208(3) may be associated with another flow where switching device 206(3) is an ingress switching device and switching device 206(4) is an egress switching device. The fault handling service 102 computes the amounts of traffic (e.g., the units illustrated in FIG. 2) based on a fault protection level 116 specifying that $k_e=1$.

Accordingly, if a link failure 210 (e.g., a data plane fault) occurs at a location between switching device 206(2) and switching device 206(4) as shown in the second configuration 204, the network rescales the traffic such that a first tunnel 212(1) communicates 8.5 units of traffic from switching device 206(2) to switching device 206(4) via switching device 206(1), a second tunnel 212(2) communicates 1.5 units of traffic from switching device 206(3) to switching device 206(4) via switching device 206(1), and a third tunnel 212(3) communicates 7 units of traffic from switching device 206(3) directly to switching device 206(4).

As shown, tunnel 208(2) and tunnel 208(3) from the first configuration 202 remain unchanged through the re-scaling process. However, tunnel 212(1) in the second configuration 204 is a tunnel rescaled to handle the combined flows of tunnel 208(1) and tunnel 208(4) from the first configuration 202 as a result of the link failure 210. In the second configuration 204, the load on the direct link from switching device 206(1) to switching device 206(4) totals ten units (i.e., 8.5+1.5), which is at or within the maximum capacity of the link.

While FIG. 2 shows that the link failure occurs between switching device 206(2) and switching device 206(4), the units specified in the first configuration 202, e.g., as computed by the fault handling service 102, can proactively handle a single link failure elsewhere in the network and congestion will still be avoided as long as there is not more than a single link failure ($k_e=1$). For example, if the link between switching device 206(1) and switching device 206(3) fails instead of the link between switching device 206(2) and switching 206(4), then the 1.5 units communicated via tunnel 208(2) may be added to the 7 units communicated via tunnel 208(3) such that a total of 8.5 units are communicated via the link between switching device 206(3) and switching device 206(4) in a rescaled configuration (e.g., 8.5 units is less than the ten unit capacity for a link).

Moreover, the first configuration 202 can also handle a single switch failure (e.g., $k_v=1$) without causing congestion. For example, if switching device 206(1) fails, then the 1.5 units communicated via tunnel 208(1) can be rescaled to be communicated via tunnel 208(4) (e.g., 7+1.5<10 units) and the 1.5 units communicated via tunnel 208(2) can be rescaled to be communicated via tunnel 208(3) (e.g., 7+1.5<10 units).

Accordingly, the fault handling service 102 is configured to compute traffic amounts for flows and proactively configure the network based on the computed traffic amounts, e.g., as shown in the first configuration 202, so that there is enough available or spare capacity to absorb rescaled traffic (e.g., proportional rescaling) that may arrive at a link due to a link failure that occurs after the network is configured to be robust against the faults, e.g., as shown in the second configuration 204.

Figure 3:
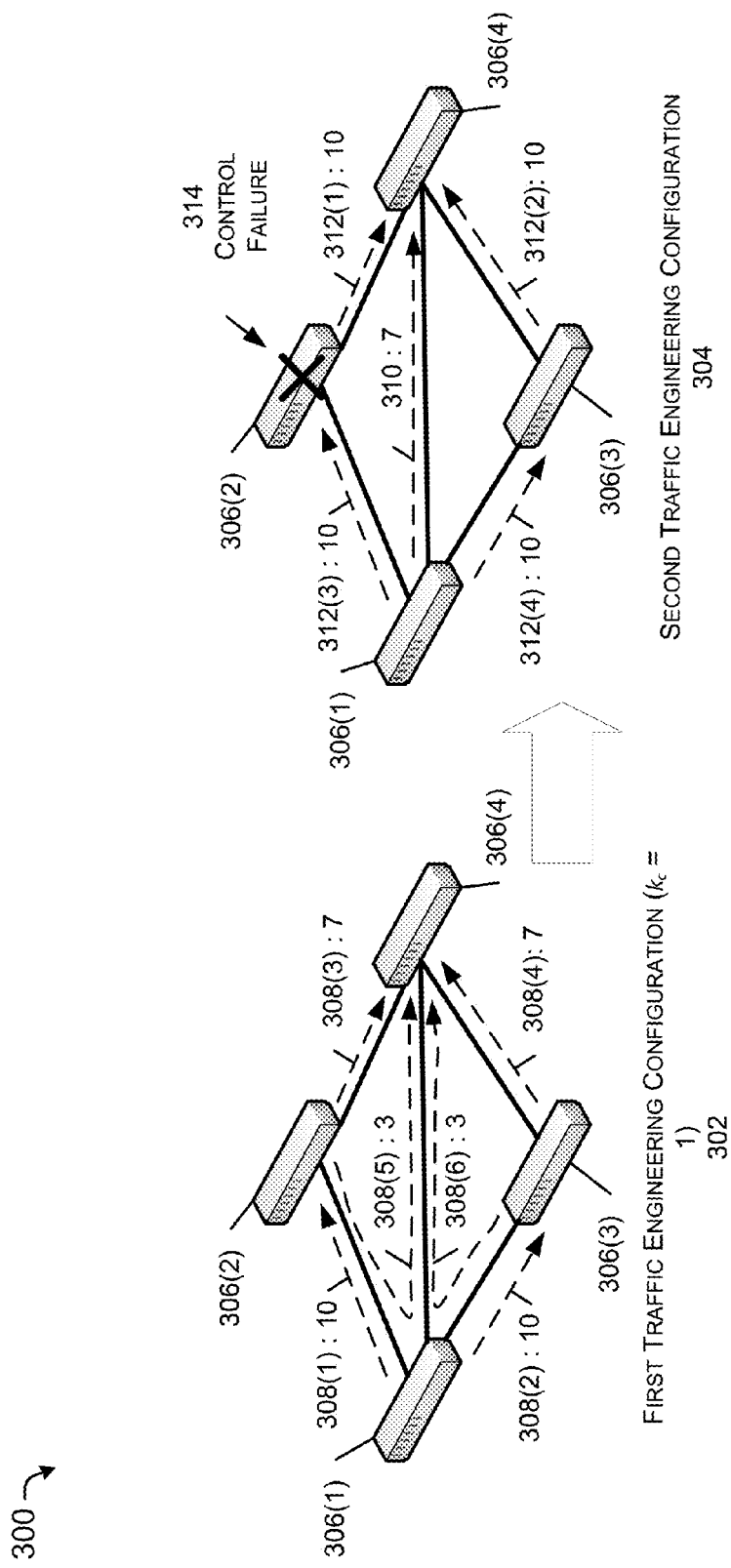
FIG. 3 illustrates a diagram that shows an example network configured to handle up to a predetermined maximum number of control failures, in accordance with various embodiments.

As another example, FIG. 3 illustrates a diagram 300 showing how the fault handling service 102 configures a network to handle up to a maximum number of control failures $k_c$. Thus, FIG. 3 is directed to control plane faults and illustrates a first traffic engineering (TE) configuration 302 and a second TE configuration 304 modeling traffic of a network or part of a network. The predetermined maximum number of allowed control plane faults equal to one (e.g., $k_c=1$). In the first TE configuration 302 and the second TE configuration 304, the traffic is communicated by or via a first switching device 306(1), a second switching device 306(2), a third switching device 306(3) and a fourth switching device 306(4) in the example of FIG. 3. In this example, the link capacity is ten units. The arrangement of links and devices and the link capacity, as well as the traffic being communicated in the first TE configuration 302, may be represented by a network topology accessible by the fault handling service 102.

In the first TE configuration 302: a first tunnel 308(1) (tunnels are shown as a dashed line in FIG. 3 as well) communicates 10 units of traffic from switching device 306(1) directly to switching device 306(2), a second tunnel 308(2) communicates 10 units of traffic from switching device 306(1) directly to switching device 306(3), a third tunnel 308(3) communicates 7 units of traffic from switching device 306(2) directly to switching device 306(4), a fourth tunnel 308(4) communicates 7 units of traffic from switching device 306(3) directly to switching device 306(4), a fifth tunnel 308(5) communicates 3 units of traffic from switching device 306(2) to switching device 306(4) via switching device 306(1), and a sixth tunnel 308(6) communicates 3 units of traffic from switching device 306(3) to switching device 306(4) via switching device 306(1).

In this example, the fault handling service 102 or a traffic engineering controller wants to update the switching devices to accommodate a new tunnel 310 as shown in the second TE configuration 304. Therefore, the fault handling service 102 may attempt to update switching device 306(2) with a new configuration (e.g., new distribution weights) so that tunnel 312(1) communicates the combined traffic previously communicated via tunnels 308(3) and 308(5) in the first TE configuration 302 (e.g., 7+3=10 units). Moreover, the fault handling service 102 or the traffic engineering controller may attempt to update switching device 306(3) with a new configuration so that tunnel 312(2) communicates the combined traffic previously communicated via tunnels 308(2) and 308(4) in the first TE configuration 302 (e.g., 7+3=10 units). Tunnel 312(3) and tunnel 312(4) in the second TE configuration 304 are unchanged from tunnels 308(1) and 308(2) in the first TE configuration 302.

Accordingly, if a control failure 314 (e.g., a control plane fault) occurs at switching device 306(2) (e.g., the attempt to update the switching device fails or is delayed and not implemented in a timely manner), as shown in the second TE configuration 304, then switching device 306(2) will continue routing traffic in accordance with the first TE configuration 302. Accordingly, the tunnel 312(1) will not be successfully configured to adopt the three units of traffic from tunnel 308(5). However, the fault handling service 102 is configured to compute a traffic amount of seven units for tunnel 310 ensuring that even if up to one switching device fails, link congestion will not occur. For example, even with the old configuration traffic from tunnel 308(5) and the new tunnel 310, the capacity of the link between switching device 306(1) and switching device 306(4) does not exceed the ten unit capacity (e.g., 3+7≤10 units).

While FIG. 3 shows that the control failure occurs at switching device 306(2) (e.g., a first combination of possible faults), the TE configurations in FIG. 3 can proactively handle a control failure elsewhere in the network, e.g., at switching device 306(3) (e.g., a second combination of possible faults).

Figure 4:
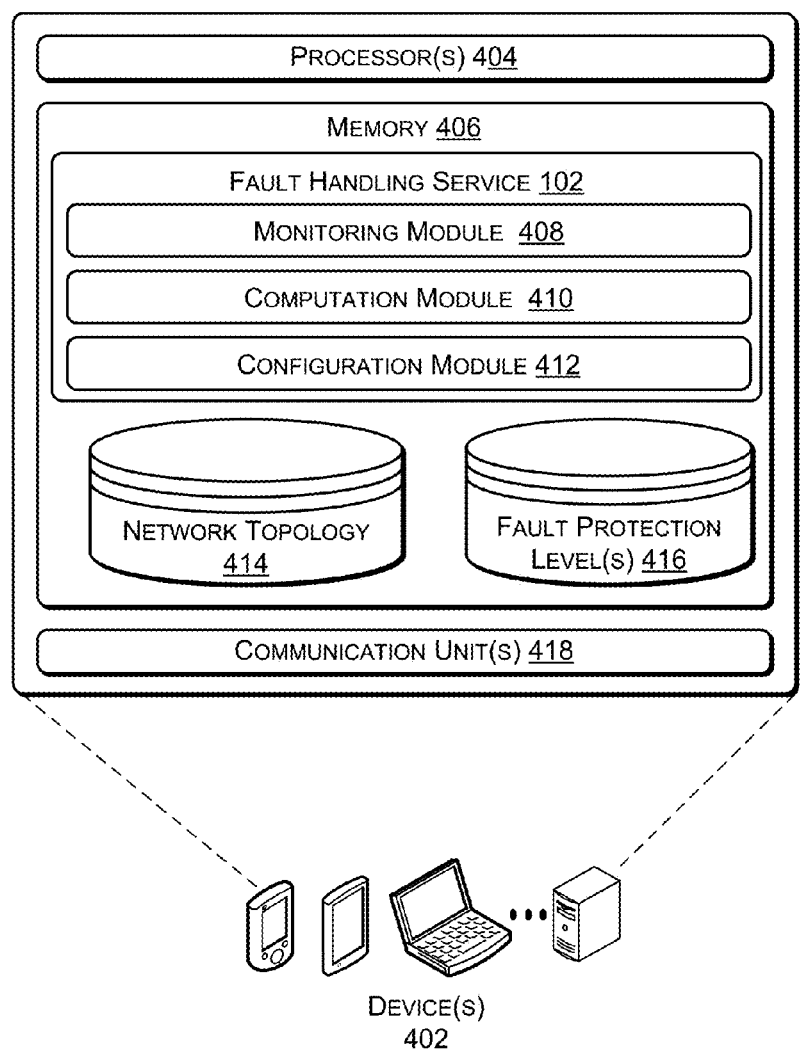
FIG. 4 illustrates a diagram showing an example environment that implements the fault handling service, in accordance with various embodiments.

FIG. 4 is a diagram showing an example environment 400 that implements the fault handling service 102 described above. In various embodiments, fault handling service 102 may be implemented via one or more devices 402. A device 402 may comprise a stationary device such as a desktop computing device, a server computing device, or the like. A device 402 may alternatively comprise a mobile or portable device such as a laptop computing device, a tablet computing device, a smart phone device, a cellular phone device, a personal digital assistant (PDA) device, an electronic book device, or the like.

The device(s) 402 include fault handling service 102 configured to implement the techniques described herein. A device 402 may individually and separately include one or more processor(s) 404 and memory 406. The processor(s) 404 may be a single processing unit or a number of units, each of which could include multiple different processing units. The processor(s) 404 may include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-programmable Gate Array (FPGA), an Application-specific Integrated Circuit (ASIC), an Application-specific Standard Products (ASSP), a state machine, a Complex Programmable Logic Device (CPLD), other logic circuitry, a system on chip (SoC), and/or any other devices that perform operations based on instructions. Among other capabilities, the processor(s) 404 may be configured to fetch and execute computer-readable instructions stored in the memory 406.

The memory 406 may include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PRAM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a device.

In contrast, communication media includes computer-readable instructions, data structures, program modules, or other data in a modulated data signal, such as a carrier wave. As defined herein, computer storage media does not include communication media.

The memory 406 may include an operating system that is configured to manage hardware and services within and coupled to a device for the benefit of other modules, components and devices. In some instances, at least part of the fault handling service 102 may be implemented within, or by, the operating system.

The fault handling service 102 includes one or more of a monitoring module 408, a computation module 410 and a configuration module 412. As used herein, the term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on one or more processors across one or more devices, in other embodiments, any or all of the modules may be implemented in whole or in part by hardware (e.g., as an ASIC, a specialized processing unit, etc.) to execute the described functions. In other instances, the functions and/or modules are implemented as part of a device driver, firmware, and so forth.

In various embodiments, the monitoring module 408 is configured to observe the network topology (e.g., of at least part of a network) and/or store the network topology in a network topology store 414. Network topology is the arrangement of the various components (e.g., device location, device type, device functionality, links between pair of devices, etc.) of a network. The network topology may include physical topology representing the placement of the network components and logical topology representing data flows within the network. Thus, the monitoring module 208 is configured to observe and store traffic flows communicated from various source devices (e.g., ingress switches) to various destination devices (e.g., egress switches). The monitoring module 408 may determine the network topology in real-time, in accordance with a periodic schedule and/or in response to a particular event.

The network topology may also include other network settings, e.g., a maximum link capacity (e.g., bandwidth) for individual links in the network, a capacity demand of a flow on the network. As discussed above, the fault handling service 102 computes traffic amounts such that it ensures that a link will not be congested (e.g., the maximum link capacity will not be exceeded) as long as a number of actual faults does not exceed a predetermined maximum number of allowed faults.

The computation module 410 is configured to compute the configuration settings 118. The computation module 410 may determine (e.g., receive or access) a current or most recent network topology from the network topology store 414. Moreover, the computation module 410 is configured to determine (e.g., receive or access) one or more fault protection levels 116 from a fault protection level store 416. A fault protection level 116 may specify a predetermined maximum number of faults allowed for a network (e.g., a predetermined maximum number for one or more of a link failure, a switch failure and/or a control failure). The fault protection level store 416 may store varying fault protection levels accessible by the computation module 410 in different scenarios. For example, the fault handling service 102 may implement different levels of protection based on different time periods (e.g., day time versus night time for a particular time zone), different demands on the network, etc.

Based on the network topology and the fault protection levels, the computation module 410 generates a model, e.g., a system of equations, representing different combinations of possible faults that can potentially occur in the network (e.g., type of a fault, location of a fault, etc.). The computation module 410 may then use the model to compute traffic amounts, e.g., as configuration settings 118. As discussed above, the computed traffic amounts allow for additional traffic to arrive at a link (e.g., as part of a traffic rescaling process in response to one or more faults) without the link exceeding a communication capacity as long as the number of faults that occur is less than or equal to the predetermined maximum number of faults (e.g., as defined for a type of fault). In various implementations, the protection module 410 may encode constraints based on the different combinations of possible faults and then use a sorting networks approach to solve the constraints efficiently, as further discussed herein.

The configuration module 412 is configured to issue instructions that configure the network 104 so that congestion and data packet loss due to faults (e.g., unknown faults that have not yet occurred) can be avoided. For example, the configuration module 412 may generate specific commands (e.g., device-specific commands) to apply to switching devices in the network so that traffic is communicated and/or distributed based on the amounts of traffic computed by the computation module 410.

In various embodiments, the fault handling service 102 may be implemented as part of a traffic engineering controller. Alternatively, the fault handling service 102 may be configured to interface with a traffic engineering controller. Thus, a device 402 may include one or more communication unit(s) 418. The communication unit(s) 418 may be configured to facilitate a wired and/or wireless connection to one or more networks (e.g., network 104), applications operated by various service or content providers, and/or other devices. Therefore, the communication unit(s) 418 may implement one or more of various communications or network connection protocols.

Figure 5:
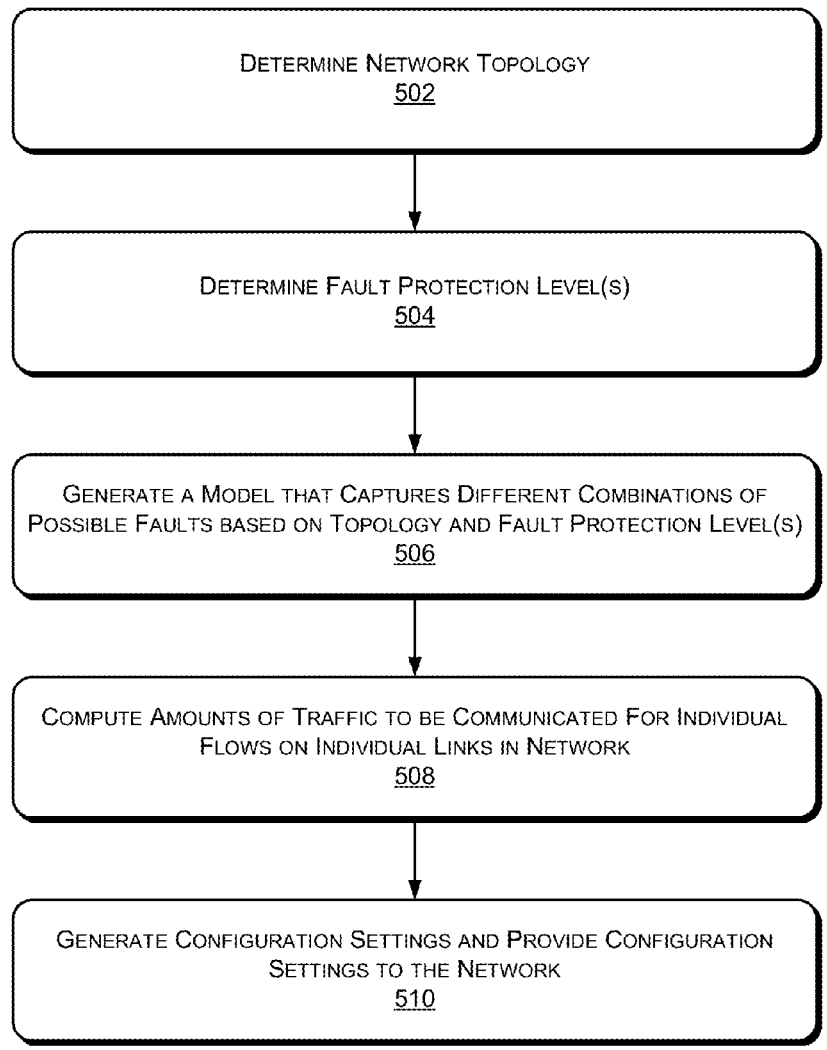
FIG. 5 illustrates an example process that configures a network so that a predetermined maximum number of faults can occur without causing congestion on a link, in accordance with various embodiments.
Figure 6:
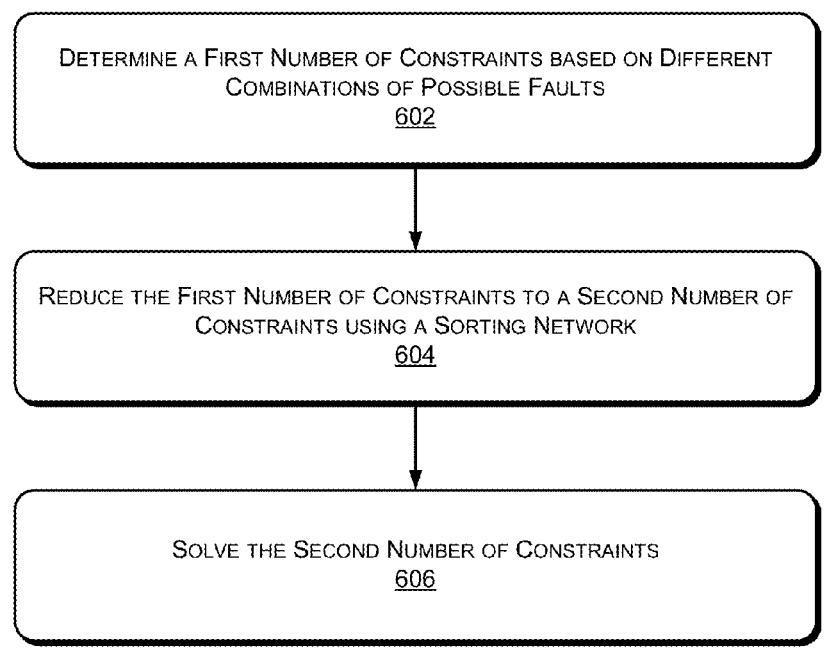
FIG. 6 illustrates an example process that uses a sorting networks approach so that the fault handling service can efficiently solve constraints associated with the different combinations of possible faults, in accordance with various embodiments.

FIGS. 5 and 6 illustrate example processes depicted as logical flow graphs, which represent a sequence of operations that can be implemented in hardware, software, firmware, or a combination thereof. In the context of software, the operations represent computer-executable instructions that, when executed by one or more processors, configure a computing device to perform the recited operations. Generally, computer-executable instructions include routines, programs, objects, components, data structures, and the like that configure a computing device to perform particular functions or implement particular abstract data types. In some embodiments, any or all of the operations may be implemented in whole or in part by hardware (e.g., as an ASIC, a specialized processing unit, etc.) to execute the described functions. In some instances, the functions and/or modules are implemented as part of an operating system. In other instances, the functions and/or modules are implemented as part of a device driver, firmware, and so on.

The order in which the operations are described is not intended to be construed as a limitation, and any number of the described operations can be combined in any order and/or in parallel to implement the processes.

FIG. 5 illustrates an example process 500 that configures a network so that it is robust (e.g., a guarantee that a link will not be congested) against up to a predetermined maximum number of faults. The example operations in FIG. 5 may be described with reference to the modules, components and/or elements illustrated in any one of FIGS. 1-4.

At 502, the observation module 408 may observe and store network topology (e.g., in network topology store 414). For example, the network topology may provide information related to the arrangement of the various components of the network (e.g., device location, device type, device functionality, links between pair of devices, etc.). In various implementations, the network topology observed and stored may include a traffic demand matrix describing the flows of the network (e.g., a source or ingress device for a flow, a destination or egress device for a flow, total amount of traffic for a flow, tunnel distribution of traffic for a flow, etc.).

At 504, the computation module 410 may determine one or more fault handling levels that specified a predetermined maximum number of faults. For example, the computation module 410 may access the fault protection level store 416 or receive a fault protection level from an entity that manages the network. In various implementations, a fault protection level may indicate a predetermined maximum number of faults of a specific type (e.g., a link failure, a switch failure or a control failure). Thus, the computation module 410 may vary a level of network protection by computing traffic amounts depending on whether the network is to be robust against link failures ($k_e$), switching device failures ($k_v$), control failures ($k_c$), a combination of two of the types of failures, or a combination of all three types of failures.

At 506, the computation module 410 may generate a model that captures different combinations of possible faults based on the network topology and the fault protection levels. For example, the computation module 410 may access the information in the network topology store 414 and the fault protection level store 416. In various implementations, the model is a system of equations that includes variables associated with potential faults (e.g., location of faults in the network arrangement described by the topology).

At 508, the computation module 410 may compute amounts of traffic, for individual flows, to be communicated on the links in the network. For example, the computation module 410 may solve the system of equations such that the computed traffic amounts allow for additional traffic to arrive at a link (e.g., as part of a proportional traffic rescaling process in response to one or more faults) without the link exceeding a communication capacity as long as the number of faults that occur is less than or equal to the predetermined maximum number of faults (e.g., as defined for a type of fault).

At 510, the configuration module 412 may generate configuration settings based on the computed amounts of traffic and provides the configuration settings (e.g., instructions, commands, etc.) to the network.

FIG. 6 illustrates an example process 600 that uses a sorting networks approach so that the fault handling service can efficiently solve constraints associated with the different combinations of possible faults. The example operations in FIG. 6 may be described with reference to the modules, components, elements and/or operations illustrated in any one of FIGS. 1-5. For instance, the example process 600 may be implemented in accordance with operation 506 and/or operation 508 in FIG. 5.

At 602, the computation module 410 may determine a first number of constraints to be solved based on the different combinations of possible faults captured by a model (e.g., a system of equations). As discussed above, there may be scenarios where the first number of constraints is large enough such that the fault handling service 102 is presented with a computation challenge in solving the constraints.

At 604, the computation module 410 may reduce the first number of constraints to a second number of constraints using a sorting network. This allows the computations to be performed with less computational overhead.

At 606, the computation module 410 may solve the second number of constraints and computes the amounts of traffic to be communicated in the network.

Provided herein are example computations performed to determine the traffic distribution of flows such that the network is robust against up to a predetermined maximum number of faults. As discussed above, the network 104 may include a large number of devices (e.g., tens, hundreds, thousands, etc.). Thus, determining different combinations of possible faults (e.g., locations of a number of faults up to the predetermined maximum number) presents a computational challenge because of the large amount of overhead required to compute and solve a large number of constraints associated with the different combinations of possible faults. If up to k faults are allowed (e.g., the predetermined maximum number), the computational challenge for a network capable of experiencing n possible faults (e.g., a switch failure 110 located at one of various switches in the network 104, a link failure 112 located at one of various links in the network 104, a control failure 114 at one of various switches in the network 104) may be represented as follows in Equation (1):

$$\sum_{j=1}^{k} \binom{n}{j} \qquad \text{equ. (1)}$$

Using Equation (1), if n=1000 (e.g., a reasonable number of links in a large network) and k=3, then the number of different combinations in which up to three faults occur across network components is more than $10^9$. This requires a large amount of computational overhead to solve.

The computation module 410 is configured to reduce the computational overhead by transforming a large number of constraints associated with different combinations of possible faults to a "bounded M-sum" problem (e.g., the sum of any M out of N variables is bounded). Thus, a large number of constraints in the problem can be reduced to a single constraint on the largest, or smallest, M variables. The computation module 410 may use a sorting networks approach to efficiently encode the bounded M-sum problem as O(kn) linear constraints, as further discussed herein. The computation module 410 models different combinations of possible faults based on the following: (i) if a switching device fails to update with a new configuration (e.g., a control failure), the switching device uses an old configuration; (ii) if a link fails (e.g. a link failure), ingress switching devices deterministically rescale traffic (e.g., proportional rescaling).

The discussion provided herein uses the fault handling service 102 to protect a network from faults in an example implementation related to traffic engineering (TE). Table 1 provides notations used in association with the traffic engineering of a network.

TABLE 1

| | |
|---|---|
| G | Network Graph with V Switching Devices and E Links. |
| F = {f} | Flows aggregated by Ingress-Egress Switching Device Pairs. |
| $d_f$ | The Bandwidth Demand of f in a Traffic Engineering Interval. |
| $c_e$ | The Bandwidth Capacity of Individual Link e. |
| $T_f$ | The Set of Tunnels Established for Individual Flow f. |
| l[t, e] | A Binary Variable where "1" Indicates a Tunnel t Uses Link e and "0" Indicates Otherwise. |
| s[t, v] | A Binary Variable where "1" Indicates a Tunnel t has a Source Switching Device v and "0" Indicates Otherwise. |
| $b_f$ | Bandwidth Granted to Flow f. |
| $a_{f,t}$ | The Bandwidth Allocated for Flow f on Tunnel t. |

TABLE 1-continued

| | |
|---|---|
| $\beta_{f,t}$ | The Upper Bound of Traffic for Flow f. |
| $w_{f,t}$ | The Traffic Splitting Weights of Flow f on Tunnel t. |
| $p_f(p)$ | The Maximum Number of Tunnels for a Flow f to Traverse a Link. |
| $q_f(p)$ | The Maximum Number of Tunnels for a Flow f to Traverse a Switching Device |
| $k_c, k_e, k_v$ | The Predetermined Maximum Number of Control Failures, Link Failures and Switch Failures, respectively. |
| $\tau_f$ | The Minimum Number of Residual Tunnels of Flow f With Up To $k_e$ Link Failures and $k_v$ Switch Failures |

Thus, an input to the fault handling service 102 in a traffic engineering implementation may be a graph G=(V;E), where V is a set of switching devices and E is a set of direct links where each direct link is established between two switching devices. The graph, G, may represent at least part of the network topology determined and stored by the monitoring module 408. Each link e in E may have a capacity, $c_e$, (e.g., a predetermined capacity such as ten units as provided in the examples of FIG. 2 and FIG. 3). The computation module 410 may represent the traffic demand on the network as a set of flows, where each flow f is an aggregation of traffic communicated from an ingress switching device to an egress switching device. The bandwidth demand of f in a traffic engineering (TE) interval is $d_f$ and the traffic can be spread across a set of pre-established tunnels $T_f$.

In this example implementation, the computation module 410 is configured to compute output bandwidth allocation $\{b_f|\forall f\}$ of each flow and how much of the flow can traverse each tunnel $\{a_{f,t}|\forall f, t \in T_f\}$. The computation module 410 can solve (e.g., compute) the bandwidth allocation, e.g., for a DCN or a WAN, based on a path constrained multi-commodity flow problem, as follows:

$$\max \Sigma_{f \in F} b_f \quad \text{equ. (2)}$$

$$s.t. \forall e \in E: \Sigma_{f \in F, t \in T_f} a_{f,t} l[t,e] \leq c_e \quad \text{equ. (3)}$$

$$s.t. \forall f \in F: \Sigma_{t \in T_f} a_{f,t} \geq b_f \quad \text{equ. (4)}$$

$$\forall f \in F, t \in T_f: 0 \leq b_f \leq d_f, 0 \leq a_{f,t} \quad \text{equ. (5)}$$

Equation (2) is formulated to maximize network throughput. Equation (3) indicates that no link in the network is to be overloaded. In Equation (3), l[t,e] is a binary variable that denotes whether or not a tunnel, t, traverses a link, e. Equation (3) indicates that the sum of the allocation of a flow across tunnels is to be no less than a rate allocated to the flow. Equation (4) indicates that the bandwidth granted to a flow is no more than the demand of the flow and that the variables are non-negative. In some implementations, the computation module 410 may update a rate limiter, $\{b_f\}$, of a flow and ingress switches so that they use traffic splitting weights provided in Equation (6):

$$w_{f,t} = a_{f,t} / \Sigma_{t \in T_f} a_{f,t} \quad \text{equ. (6)}$$

In various embodiments, to model control plane faults (e.g., the control failure 114), the computation module 410 may compute a new configuration, $(\{b_f\}, \{a_{f,t}\})$, so that no congestion, e.g., at a link, occurs as long as $k_c$ or fewer switching devices fail to update the old configuration, $(\{b'_f\}, \{a'_{f,t}\})$. As used herein, (i) $\lambda_{84} = 1$ denotes a configuration failure for at least one of the flows with the ingress switch v, and (ii) $\lambda_{84} = 0$ denotes that configurations for all the flows starting at the ingress switch v have succeeded. The computation module 410 may represent control plane faults in a network by a vector $\lambda = [\lambda_v | v \in V]$ that indicates the status of each switching device. Thus, to ensure that the computed network configuration is robust to $k_c$ faults, the network cannot have an overloaded link under the set of cases represented by Equation (7):

$$\Lambda_{k_c} = \{\lambda | \Sigma_{v \in V} \lambda_v \leq k_c\} \quad \text{equ. (7)}$$

The computation module 410 may capture the requirement of Equation (7) as follows in Equation (8):

$$\forall e \in E, \lambda \in \Lambda_{k_c}: \Sigma_{v \in V} \{(1-\lambda_{84})\hat{a}_{v,e} + \lambda_v \hat{\beta}_{v,e}\} \leq c_e \quad \text{equ. (8)}$$

In Equation (8), $\hat{a}_{v,e}$ is the total traffic that can arrive at link, e, from flows starting at switching device, v, if there is no configuration fault as represented by Equation (9):

$$\forall v \in V, e \in E: \hat{a}_{v,e} = \Sigma_{f \in F, t \in T_f} a_{f,t} l[t,e] s[t,v] \quad \text{equ. (9)}$$

In Equation (9), s [t,v] is a binary variable denoting whether or not a source switching device for a tunnel, t, is v.

In Equation (8), $\hat{\beta}_{v,e}$ is the upper bound on traffic of a link, e, from flows starting at v when a fault occurs (e.g., $\lambda_v = 1$), which may be represented as follows in Equation (10).

$$\forall v \in V, e \in E: \hat{\beta}_{v,e} = \Sigma_{f \in F, t \in T_f} \beta_{f,t} l[t,e] s[t,v] \quad \text{equ. (10)}$$

In Equation (10), $\beta_{f,t}$ is the upper bound on traffic of a flow, f, on tunnel t when a fault occurs for f. In instances where the updates in rate limiters are successful, $\beta_{f,t}$ can be modeled as follows in Equation (11):

$$\forall f \in F, t \in T_f: \beta_{f,t} = \max\{w_{f,t}'b_f, a_{f,t}\} \quad \text{equ. (11)}$$

In Equation (11), $w_{f,t}'$ is a splitting weight of a flow for tunnel, t, in an old configuration (e.g., which may be known or observed by the monitoring module 408).

Therefore, using Equations (8-11), the computation module 410 can find TE configurations that are robust to $k_c$ control plane faults. Stated another way, the network can handle up to a number, $k_c$, of control plane faults without causing network congestion (e.g., a link exceeding its capacity).

In various embodiments, to model data plane faults (e.g., a switch failure 110 or a link failure 112), the computation module 410 may compute flow allocations such that no congestion occurs as long as (i) a number of failed links is less than or equal to $k_e$ and (ii) a number of failed switching devices is less than or equal to $k_q$. This may apply for link failures that are not incident on the failed switching devices. The computation module 410 may consider switching device failures and link failures separately because a switching device may have a large number of incident links. A link, e, failing may be denoted as $\mu_e = 1$, and a switch failing may be denoted as $\eta_v = 1$. The variables in the preceding sentence may be zero if a link or a switch have not failed. The computation module 410 may then represent a data plane fault as vectors, $(\mu, \eta)$, where a vector $\mu = [\mu_e | e \in E]$ and a vector $\eta = [\eta_v | v \in V]$. To ensure that a traffic engineering configuration is robust to $k_e$ link failures and $k_v$ switch failures requires that there is no overloaded link under a set of hardware failure cases as specified by Equation (12):

$$U_{k_e, k_v} = \{(\mu, \eta) | \Sigma_e \mu_e \leq k_e, \Sigma_v \eta_v \leq k_v\} \quad \text{equ. (12)}$$

Data plane faults can cause congestion because they alter traffic distribution over the network when ingress switching devices rescale traffic (e.g., move traffic from an impacted tunnel to residual tunnels). Thus, given a fault case, $(\mu, \eta)$, the computation module 410 knows the residual tunnels $T_f^{\mu, \eta}$ of each flow f that do not traverse a failed link and/or a failed switch and the residual tunnel of a flow f has to be able to hold its allocated rate as represented by Equation (13):

$$\forall f \in F, (\mu,\eta) \in U_{k_e,k_v} : \Sigma_{t \in T_f^{\mu,\eta}} a_{f,t} \geq b_f \quad \text{equ. (13)}$$

In situations where a flow f has no residual tunnels, e.g., $T_f^{\mu,\eta} = \emptyset$, under a failure case $(\mu,\eta)$, the flow size $b_f$ may be fixed to zero. Therefore, Equation (13) may ensure that no link is overloaded.

Looking at Equation (13), as the number of residual tunnels increases then network throughput also increases. Thus, in various embodiments, the network topology may be configured (e.g., by the fault handling service, by another traffic engineering controller, etc.) to improve network throughput by laying out tunnels such that a loss of tunnels (e.g., a number of tunnels lost) for a flow is minimized if faults occur. For example, the network may be configured based on (p, q) link-switch disjoint tunnels such that, for an individual flow, at most p tunnels can traverse a link and at most q tunnels can traverse a switching device. The parameters p and q may be defined by the fault handling service 102 and/or the traffic engineering controller and may be flow specific.

As discussed above, to solve the large number of constraints that result from modeling the different combinations of possible faults for the network, the computation module 410 is configured to transform the constraints into a bounded M-sum problem and then encode the bounded M-sum problem using a sorting networks approach. The bounded M-sum problem may be defined such that given a set of N variables, the sum of any M of those variables should be less or more than a bound B. Thus, if $N_M$ is the set of all variable subsets with cardinality ≤M, then the bounded M-sum problem may be represented as follows in Equation (14):

$$\forall S \in N_M : \Sigma_{n_j \in S} n_j \leq B \quad \text{equ. (14)}$$

In Equation (14), S represents the different possible fault combinations. If $n^j$ is an expression for the jth largest variable in N, all constraints above hold if:

$$\Sigma_{j=1}^M n^j \leq B \quad \text{equ. (15)}$$

Thus, the computation module 410 can find efficient (linear) expressions for the largest M variables in N, and therefore, the computation module 410 can replace the original constraints (e.g., a large number of constraints) with a reduced number of constraints (e.g., one constraint) that can be solved more efficiently.

In the case of control plane faults, Equation (8) can be rewritten as Equation (16) to transform the constraints into the bounded M-sum problem:

$$\forall e \in E, \lambda \in \Lambda_{k_c} : \Sigma_{v \in V} \lambda_v (\hat{\beta}_{v,e} - \hat{a}_{v,e}) \leq c_e - \Sigma_v \hat{a}_{v,e} \quad \text{equ. (16)}$$

With $D = \{\hat{\beta}_{v,e} - \hat{a}_{v,e} | v \in V\}$, $d^j$ being the jth largest element in D, and since $\hat{\beta}_{v,e} - \hat{a}_{v,e} \geq 0$, Equation (16) is equivalent to Equation (17) as follows:

$$\forall e \in E : \Sigma_{j=1}^{k_c} d^j \leq c_e - \Sigma_v \hat{a}_{v,e} \quad \text{equ. (17)}$$

Thus, the computation module 410 can use Equations (16) and (17) to transform an original $|E| \times |\Lambda_{k_c}|$ constraints into $|E|$ constraints (e.g., one for each link).

In the case of data plane faults, the tunnels of flow f may be represented as a $(p_f, q_f)$ link-switch disjoint. Thus, for a data plane fault case $(\mu,\eta) \in U_{k_e,k_v}$, a number of residual tunnels is no less than $\tau_f = |T_f| - k_e p_f - k_v q_f$. If $a_{f,t}^j$ is the jth smallest element in $A_f = \{a_{f,t} | t \in T_f\}$, then Equation (18) ensures that all constraints in Equation (13) are satisfied:

$$\forall f : \Sigma_{j=1}^{\tau_f} a_{f,t}^j \geq b_f \quad \text{equ. (18)}$$

The computation module 410 can ensure that all constraints are satisfied because the left side in Equation (18) is the worst-case bandwidth allocation that flow f can have from its residual tunnels under any case in $U_{k_e,k_v}$.

Figure 7:
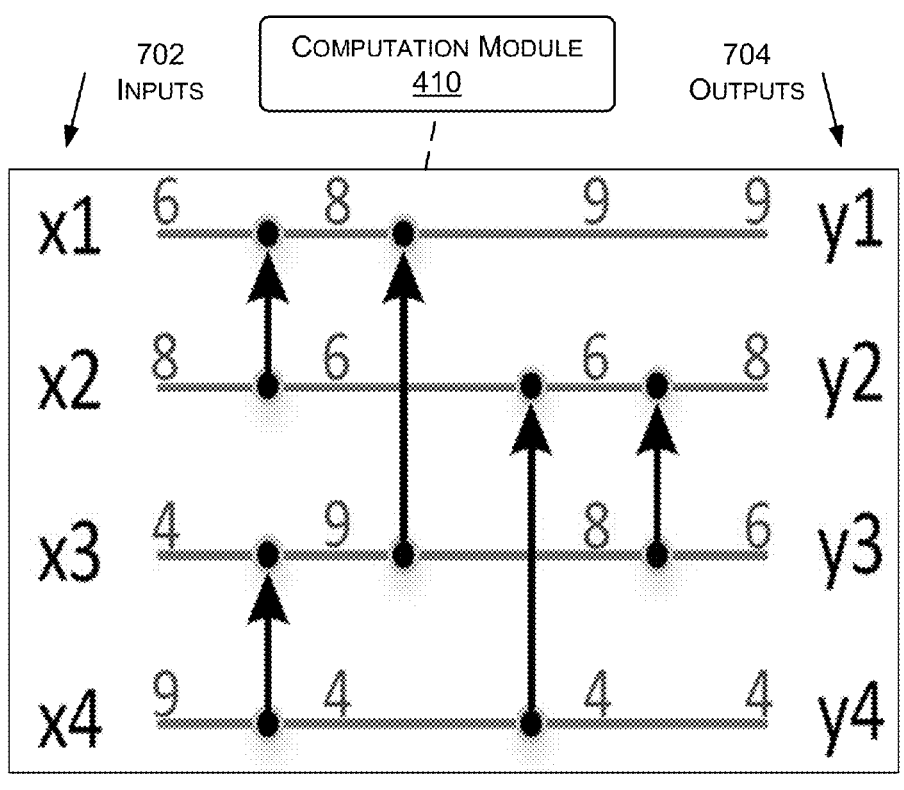
FIG. 7 illustrates a diagram showing an example sorting network used to implement a fault handling service, in accordance with various embodiments.

The computation module 410 then expresses the largest M variables as linear constraints based on sorting networks. Sorting networks are networks of compare-swap operators that can sort any array of N values. An example sorting network 700 to sort four input values 702 (e.g., x1=6, x2=8, x3=4, x4=9) is shown in FIG. 7. This example network 700 is based on a merge sort algorithm where each compare-swap operator takes two inputs from the left, compares the two inputs, and moves the greater of the two inputs upwards and the lesser of two inputs downwards. A characteristic of sorting networks is that the sequence of compare-swap operations is implemented independent of the inputs. This characteristic allows the computation module 410 to encode its computation as linear expressions for each of the largest to smallest variable. Thus, the outputs 704 (e.g., y1, y2, y3, y4) of the example network 700 are in a sorted order (e.g., 9>8>6>4).

Since the largest M variables are to be sorted, then the computation module 410 may use a partial network with O(NM) operators. In various implementations, the computation module 410 may implement a sorting network using a bubble sort that terminates after a number of stages yields the largest M values.

CONCLUSION

Although the present disclosure may use language that is specific to structural features and/or methodological acts, the invention is not limited to the specific features or acts described herein. Rather, the specific features and acts are disclosed as illustrative forms of implementing the invention.

What is claimed is:
1. A method comprising:
   determining a predetermined maximum number of faults for at least a portion of a network;
   determining a topology of the at least the portion of the network;
   determining one or more flows of the at least the portion of the network;
   generating, by one or more hardware processors and based at least in part on the predetermined maximum number of faults and the topology of the at least the portion of the network , a model of different combinations of one or more faults for the at least the portion of the network, wherein the model includes a first number of constraints associated with the different combinations of the one or more faults for the at least the portion of the network;
   reducing the first number of constraints in the model to a second number of constraints that is less than the first number of constraints using sorting networks;
   computing, based at least in part on the model and for individual flows of the one or more flows, an amount of traffic to be communicated via individual ones of one or more paths such that congestion is avoided if a number of actual faults that occur in the at least the portion of the network is less than or equal to the predetermined maximum number of faults; and
   causing, for individual flows of the one or more flows, traffic to be distributed in the at least the portion of the network based at least in part on the amount of traffic to be communicated via the individual ones of the one or more paths.

2. The method of claim 1, wherein the one or more flows individually communicate traffic from a source device to a destination device and the one or more flows traverse at least part of the topology, the topology representing:
   an arrangement of a plurality of devices in the at least the portion of the network and a plurality of links between the plurality of devices; and
   a capacity for individual links of the plurality of links, wherein the computing ensures that the capacity of individual links of the plurality of links is not exceeded as long as the predetermined maximum number of faults is not exceeded.

3. The method of claim 2, wherein the computing the amount of traffic to be communicated via the individual ones of the one or more paths provides bandwidth availability on individual links of the plurality of links such that the capacity will not be exceeded if additional traffic arrives in response to an occurrence of no more than the predetermined maximum number of faults.

4. The method of claim 1, wherein the predetermined maximum number of faults is associated with a control failure in which one or more switching devices fail to update a current configuration from an old configuration to a new configuration or are delayed in updating the current configuration from the old configuration to the new configuration.

5. The method of claim 1, wherein the predetermined maximum number of faults is associated with a switch failure in which one or more switching devices fail and are unable to communicate traffic.

6. The method of claim 1, wherein the predetermined maximum number of faults is associated with a link failure in which one or more links fail and are unable to communicate traffic.

7. The method of claim 1, wherein the causing the traffic to be distributed in the at least the portion of the network for an individual flow comprises issuing distribution instructions to one or more switching devices.

8. The method of claim 1, wherein the causing the traffic to be distributed in the at least the portion of the network comprises providing flow distribution weights to one or more switching devices.

9. A system comprising:
   one or more processors;
   one or more memories storing instructions that, when executed by the one or more processors, program the one or more processors to:
      determine a predetermined maximum number of faults for at least a portion of a network;
      determine a topology of the at least the portion of the network, the topology including a communication capacity for individual ones of one or more links in the at least the portion of the network;
      generate a model of different combinations of possible faults based at least in part on the topology of the at least the portion of the network and the predetermined maximum number of faults, wherein the model includes a first number of constraints associated with the different combinations of possible faults; and
      reduce the first number of constraints included in the model to a second number of constraints that is less than the first number of constraints using a sorting network;
      compute, based at least in part on the model, a traffic configuration for the at least the portion of the network such that an individual link will not exceed the communication capacity as long as a number of faults that actually occur in the network is less than or equal to the predetermined maximum number of faults; and
      configure the at least the portion of the network based at least in part on the traffic configuration.

10. The system of claim 9, wherein the predetermined maximum number of faults is associated with a control failure in which one or more switching devices fail to update a current configuration from an old configuration to a new configuration or are delayed in updating the current configuration from the old configuration to the new configuration.

11. The system of claim 9, wherein the predetermined maximum number of faults is associated with a switch failure in which one or more switching devices fail and are unable to communicate traffic.

12. The system of claim 9, wherein the predetermined maximum number of faults is associated with a link failure in which at least one of the one or more links fail and are unable to communicate traffic.

13. The system of claim 9, wherein the instructions further program the one or more processors to configure the at least the portion of the network by providing flow distribution weights to one or more switching devices.

14. The system of claim 9, wherein the computing the traffic configuration provides bandwidth availability for the individual link so that the individual link will not exceed the communication capacity if additional traffic arrives in response to an occurrence of no more than the predetermined maximum number of faults.

15. One or more devices, comprising:
   one or more processors; and
   one or more memories storing instructions that, when executed by the one or more processors, configure the one or more devices to:
      access a network topology;
      generate a model of different combinations of possible faults based at least in part on the network topology and a predetermined maximum number of faults, wherein the model includes a first number of constraints associated with the different combinations of possible faults;
      reduce the first number of constraints in the model to a second number of constraints that is less than the first number of constraints using a sorting network; and
      compute, based at least in part on the network topology, a traffic configuration for at least a portion of a network such that an individual link in the at least the portion of the network will not exceed a communication capacity as long as a number of faults that actually occur in the at least the portion of the network is less than or equal to the predetermined maximum number of faults; and
      configure the network based at least in part on the computed traffic configuration.

16. The one or more devices of claim 15, wherein the predetermined maximum number of faults is associated with a control failure in which one or more switching devices fail to update a current configuration from an old configuration to a new configuration or are delayed in updating the current configuration from the old configuration to the new configuration.

17. The one or more devices of claim 15, wherein the predetermined maximum number of faults is associated with a switch failure in which one or more switching devices fail and are unable to communicate traffic.

18. The one or more devices of claim 15, wherein the predetermined maximum number of faults is associated with a link failure in which one or more links fail and are unable to communicate traffic.

19. The one or more devices of claim 15, wherein configuring the network comprises providing flow distribution weights to one or more switching devices.

20. The one or more devices of claim 15, wherein the instructions further configure the one or more devices to provide bandwidth availability for the individual link so that the individual link will not exceed the communication capacity if additional traffic arrives in response to an occurrence of no more than the predetermined maximum number of faults.

* * * * *